United States Patent Office

3,461,141
Patented Aug. 12, 1969

3,461,141
1-AMINO-4-CYCLOPENTADIENYLAMINO-2-ANTHRAQUINONE SULFONIC ACIDS
Fritz Graser and Hans Kiefer, Ludwigshafen (Rhine), Germany, assignors to Badische Anilin- & Soda-Fabrik Aktiengesellschaft, Ludwigshafen (Rhine), Germany
No Drawing. Filed June 1, 1966, Ser. No. 554,303
Claims priority, application Germany, June 10, 1965, B 82,345
Int. Cl. C09b 1/28
U.S. Cl. 260—371          5 Claims

ABSTRACT OF THE DISCLOSURE

An anthraquinone dye of the formula

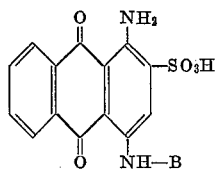

wherein B is a dimeric or trimeric cyclopentadienyl group which may be substituted by one additional amino group on a secondary carbon atom in a position non-adjacent to the —NH— bridge. The dyes are particularly useful for dyeing linear polyamide textile materials.

---

This invention relates to new and valuable anthraquinone dyes having the general formula A—NH—B in which A denotes the radical of a 1-aminoanthraquinone-2-sulfonic acid and B denotes the radical of a monoamine or diamine of a dihydro or tetrahydro compound of dimeric or trimeric cyclopentadiene. Dimeric and trimeric cyclopentadienes are formed from monomeric cyclopentadiene by a single or double Diels-Alder reaction. Dimeric cyclopentadienes have the empirical formula $C_{10}H_{12}$ while trimeric cyclopentadienes have the empirical formula $C_{15}H_{18}$. These doubly unsaturated compounds may be converted, for example according to the Ritter reaction, into monoamines or diamines, the monoamines still containing a double bond which may easily be hydrogenated. The production of these compounds is described in detail in Belgian patent specifications Nos. 655,833 and 671,585.

Reaction of these amines with 1-aminoanthraquinone-2-sulfonic acids yields valuable dyes in accordance with this invention. Those compounds are of particular interest in which the radical —NH—B is attached to the anthraquinone molecule in the 4-position and which have the general formula:

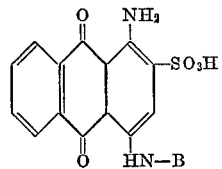

in which B denotes the radical of one of the following amines:

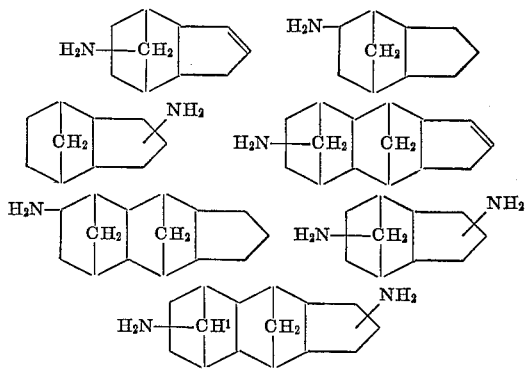

Dyes from amines, particularly monoamines, of tertahydrotricyclopentadiene and preferably of dihydrotricyclopentadiene are of particular industrial interest.

The new dyes may be used in various forms, for example as alkali metal salts, such as sodium salts or potassium salts, as amine salts, for example as hexamethylene diamine salts, dihydrodicyclopentadienylamine salts, tetrahydrodicyclopentadienylamine salts, dihydrotricyclopentadienylamine salts or tetrahydrotricyclopentadienylamine salts, as internal salts or as free acids, if desired in finely divided form, from a weakly alkaline liquor or advantageously from a neutral or weakly acid liquor. On materials, for example films, sheeting and textile materials, such as filaments, threads, fibers, flock, woven fabrics and knitted fabrics of a great variety of types they yield blue dyeings. The new dyes are particularly suitable for dyeing textile material of linear polyamides, such as polycaprolactam, polycapryllactam, polyhexamethylene diamine adipate or polycondensed omega-aminoundecylic acid. The full and level reddish blue dyeings obtained on the said are distinguished by an extremely bright shade of color and very good wet fastness properties. The dyes obtainable according to this invention also dye textile material of wool and silk bright blue shades. The dyes are also suitable for printing the abovementioned textile materials. In some cases it is advantageous to use the new dyes mixed with each other or with prior art dyes.

The dyes may be dissolved or finely dispersed in dye liquors and print pastes.

The dye liquors and print pastes may also contain wetting agents, such as the sodium salt of the disulfonimide of kerosine; diluents, such as sodium chloride and sodium sulfate; and other conventional assistants for such mixtures, for example polyalkenoxy ethers, such as the reaction product of 1 mole of octadecyl alcohol and 25 moles of ethylene oxide or the sodium salt of the acid sulfuric ester of an adduct of about 80 moles of ethylene oxide to 1 mole of sperm oil alcohol. The dye liquors and print pastes may also contain substances which impart a weakly alkaline, neutral or acid reaction to the mixtures. These substances may be added to the mixtures also during their use to modify their original pH value. The presence of a dispersing agent, for example a salt of ligninsulfonic acid or the condensation product of naphthalene-2-sulfonic acid and formaldehyde, in amounts of up to about 150% (on the weight of the dye) is of particular advantage. Print pastes may also contain thickening agents, such as British gum, tragacanth and crystal gum.

The new compounds having the preferred formula are advantageously obtained by reaction of 1-amino-4-haloanthraquinone-2-sulfonic acids with the said amines, for example by reaction of 1-amino-4-chloroanthraquinone - 2 - sulfonic acid or 1-amino-4-bromoanthraquinone - 2 - sulfonic acid or their salts. It is advantageous to start from water-soluble salts, for example alkali metal salts, such as the sodium salts or potassium salts, of these sulfonic acids. The reaction is advantageouly carried out in the presence of agents which bind hydrogen halides, for example sodium carbonate, potassium carbonate, sodium bicarbonate, sodium acetate or secondary sodium phosphate, and in the presence of copper or copper compounds, for example copper salts, such as copper sulfate, copper (I) chloride or copper acetate, in aqueous, aqueous-alcoholic or alcoholic liquids or in other organic solvents which are miscible with water, such as dimethylformamide, dioxane, mixed with water, if desired in the presence of dispersing agents, for example, the sodium salt of the condensation product of β-naphthalenesulfonic acid and formaldehyde. Particularly suitable alcohols are low molecular weight alcohols, such as methanol or ethanol.

The reaction proceeds already at moderately elevated temperature. It is advantageous to use a temperature of from 60° to 100° C., preferably at 70° to 100° C. In most cases the reaction is over within four to twenty-four hours. When using 1-amino-4-bromoanthraquinone-2-sulfonic acid or water-soluble salts thereof, a reaction period of one to eight hours is adequate as a rule. It is advantageous to use stoichiometric amounts of the reactants. It is of advantage however to use 1.2 to 3 times the equivalent amount of amine with reference to the 1-amino-4-haloanthraquinone-2-sulfonic acids or their salts. A larger excess of amine is however not harmful. The reaction also takes place with an excess of 1-amino-4-haloanthraquinone-2-sulfonic acid.

As compared with the dyes described in German patent specification No. 1,115,215, the new dyes have clearly better fastness to water and perspiration and better fastness to washing on polyamide material. Moreover, they dye polyamide practically the same strength at different pH values (pH 4, 7 and 9) whereas for example the dye of Example 1 of the said German patent specification has its optimum affinity only in the acid range. Dyes still containing one free amino group in the cycloalkyl radical obtained by the process according to this invention using diamines are also suitable for dyeing and printing cellulose textile materials using polyfunctional reactive compounds, for example by the process according to German printed application No. 1,155,088.

The invention is illustrated by the following examples in which the parts and percentages given are by weight.

EXAMPLE 1

13.5 parts of the sodium salt of 1-amino-4-bromoanthraquinone-2-sulfonic acid and 11 parts of dihydrotricyclopentadienylamine having the formula:

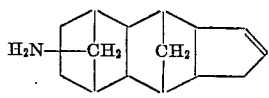

are heated to 75° to 80° C. in a mixture of 150 parts of water and 175 parts of methyl alcohol together with 7.1 parts of anhydrous sodium carbonate and 0.4 part of copper (I) chloride for five hours while stirring. The reaction mixture is then acidified with dilute mineral acid until a weakly Congo acid reaction is obtained, the reaction product is suction filtered and washed with a large volume of hot water. If necessary for further purification, the dye may be stirred with boiling weak aqueous sodium carbonate solution or caustic soda solution (pH about 9), again acidified with dilute mineral acid until it has a weakly Congo acid reaction, suction filtered while hot and washed with a large amount of hot water. A blue dye is obtained in a good yield. It dyes polycaprolactam cloth bright blue, full shades having very good fastness properties.

A very similar dye is obtained by using the same amount of tetrahydrotricyclopentadienylamine having the formula:

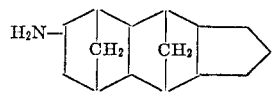

instead of dihydrotricyclopentadienylamine.

EXAMPLE 2

38.2 parts of 1-amino-4-bromoanthraquinone-2-sulfonic acid and 26 parts of dihydrodicyclopentadienylamine having the formula:

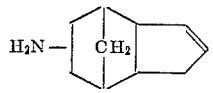

are heated at 75° to 80° C. in a mixture of 400 parts of water and 90 parts of methyl alcohol together with 30 parts of anhydrous potassium carbonate and 1.2 parts of crystallized copper sulfate for six hours while stirring. The reaction mixture is cooled and acidified with dilute mineral acid until it has a weakly Congo acid reaction. The product is suction filtered and washed well first with cold to moderately hot water and then with hot water. Further purification as described in Example 1 may be carried out if necessary. A blue dye is obtained in a good yield. It dyes wool and polyhexamethylene diamine adipate cloth bright blue shades having good to very good fastness.

When a tetrahydrodicyclopentadienylamine having one of the formulae:

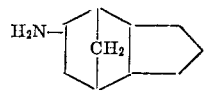

and

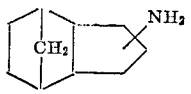

is used instead of dihydrodicyclopentadienylamine, very similar dyes are obtained. The last-mentioned amine may be prepared from dihydrodicyclopentadiene by way of the Ritter reaction.

EXAMPLE 3

20.2 parts of the sodium salt of 1-amino-4-bromoanthraquinone-2-sulfonic acid and 15.6 parts of tetrahydrotricyclopentadienylamine having the formula:

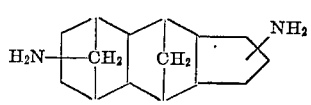

are boiled in a mixture of 220 parts of water and 270 parts af methyl alcohol with 5.5 parts of sodium carbonate and 0.7 part of copper (I) chloride for six hours while stirring. The reaction mixture is worked up as described in Example 1 and a blue dye is obtained which dyes polycaprolactam bright blue shades with good fastness. Blue dyeings having good fastness are obtained on cotton with the coemployment of reactive polyfunctional compounds, for example by the process according to German printed application No. 1,155,088.

EXAMPLE 4

A dye liquor contains in 4,000 parts of aqueous mixture 1 part of the dye obtainable according to Example 1, 2 parts of the sodium salt of the acid sulfuric acid ester of a reaction product of 1 mole of sperm oil alcohol and 80 moles of ethylene oxide and 2 parts of 30% ammonia.

100 parts of knitted polycaprolactam material is introduced into the said liquor at the boiling temperature and dyed for one hour at this temperature. Then 4 parts of ammonium sulfate is added and the material being dyed is treated for another thirty minutes at boiling temperature. The textile material is then rinsed and dried. A deep reddish blue dyeing having good fastness to light, water, perspiration and washing is obtained.

Full reddish blue shades having good light and wet fastness are similarly obtained on polyhexamethylene diamine adipate and polycondensed omega-aminoundecyclic acid.

EXAMPLE 5

A print paste consists of 30 parts of the dye of Example 1, 30 parts of thiodiethylene glycol, 500 parts of crystal gum (1:2), 30 parts of phenol and 410 parts of water. Nylon 11 cloth is printed with this paste, dried and steamed for half an hour. It is then rinsed and soaped for ten minutes at 50° C. with a solution of 0.5 part of Castile soap in 1000 parts of water. A bright reddish blue print having good fastness to light, water and washing is obtained.

Cloth of polycaprolactam or polyhexamethylene diamine adipate may be printed in the same way.

We claim:
1. A compound of the formula

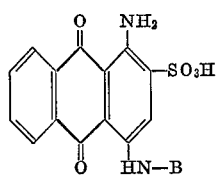

in which B denotes the amino-linked residue of a member selected from the class consisting of
  (a) the monoamine of a saturated or unsaturated dimeric or trimeric cyclopentadiene in which the amino group is substituted on a secondary carbon atom having an adjacent —$CH_2$— group, and
  (b) the diamine of a saturated dimeric or trimeric cyclopentadiene in which the amino groups are substituted on non-adjacent secondary carbon atoms, each of which has an adjacent —$CH_2$— group.

2. The dye having the formula

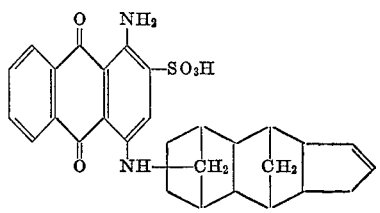

3. The dye having the formula

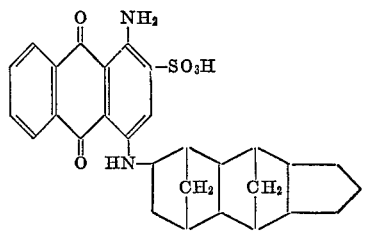

4. The dye having the formula

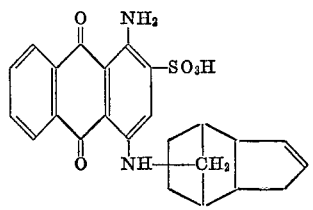

5. The dye having the formula

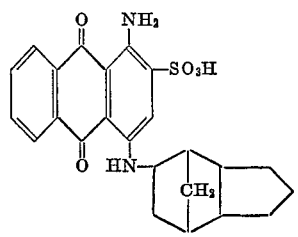

References Cited

UNITED STATES PATENTS 1,843,308  2/1932  Weinand _____ 260—371

LORRAINE A. WEINBERGER, Primary Examiner

H. C. WEGNER, Assistant Examiner

U.S. Cl. X.R.

8—39, 40